(12) United States Patent
Greene et al.

(10) Patent No.: US 7,812,771 B2
(45) Date of Patent: Oct. 12, 2010

(54) METHOD AND APPARATUS FOR IMPLEMENTATION OF A WIRELESS POWER SUPPLY

(75) Inventors: Charles E. Greene, Pittsburgh, PA (US);
Daniel W. Harrist, Carnegie, PA (US);
John G. Shearer, Ligonier, PA (US)

(73) Assignee: Powercast, LLC, Ligonier, PA (US)

( * ) Notice: Subject to any disclaimer, the term of this patent is extended or adjusted under 35 U.S.C. 154(b) by 887 days.

(21) Appl. No.: 11/494,108

(22) Filed: Jul. 27, 2006

(65) Prior Publication Data
US 2007/0222681 A1 Sep. 27, 2007

Related U.S. Application Data

(60) Provisional application No. 60/785,078, filed on Mar. 22, 2006.

(51) Int. Cl.
*H01Q 1/24* (2006.01)
*H01Q 1/42* (2006.01)
*H01Q 1/12* (2006.01)

(52) U.S. Cl. .................. 343/702; 343/872; 343/878
(58) Field of Classification Search .......... 343/700 MS, 343/702, 872, 878
See application file for complete search history.

(56) References Cited

U.S. PATENT DOCUMENTS

| 5,771,438 | A | 6/1998 | Palermo et al. |
| 6,016,046 | A | 1/2000 | Kaite et al. |
| 6,127,799 | A | 10/2000 | Krishnan |
| 6,615,074 | B2 * | 9/2003 | Mickle et al. ............... 600/509 |
| 6,882,128 | B1 * | 4/2005 | Rahmel et al. .............. 320/101 |
| 2003/0054853 | A1 | 3/2003 | Kouchiyama et al. |
| 2004/0130425 | A1 | 7/2004 | Dayan et al. |
| 2005/0045720 | A1 | 3/2005 | Fruhauf |
| 2005/0104453 | A1 | 5/2005 | Vanderelli et al. |
| 2006/0160517 | A1 * | 7/2006 | Yoon .......................... 455/299 |

FOREIGN PATENT DOCUMENTS

| DE | 10045087 | 4/2002 |
| JP | 2002176473 A | 6/2002 |
| WO | WO 9739491 | 10/1997 |
| WO | WO 9843337 | 10/1998 |
| WO | WO 2004/036774 A2 | 4/2004 |

OTHER PUBLICATIONS

International Search Report and Written Opinion mailed Apr. 16, 2007, for International Application No. PCT/US06/29486, International Filing Date Jul. 27, 2006, pp. 14.
European Search Report mailed Feb. 15, 2010, for European Patent Application No. 06800478.7, 8 pgs.

* cited by examiner

*Primary Examiner*—Shih-Chao Chen

(57) ABSTRACT

An apparatus, for wirelessly powering a device having an enclosure for a charge storage component, includes a wireless power supply which fits into the enclosure. The apparatus includes an antenna connected to the wireless power supply. A battery. A cell phone cover for a cell phone. A headphone. A wireless power adapter for a DC jack. Alternatively, the apparatus includes a substrate having discrete components and integrated circuits disposed in the device. A method for wirelessly powering a device having an enclosure for a charge storage component.

89 Claims, 14 Drawing Sheets

METHOD AND APPARATUS FOR IMPLEMENTATION OF A WIRELESS POWER SUPPLY

This application claims the benefit of U.S. Provisional Application No. 60/785,078 filing date Mar. 22, 2006

FIELD OF THE INVENTION

The present invention is related to wirelessly powering a device. More specifically, the present invention is related to wirelessly powering a device having an enclosure for a charge storage component where a wireless power supply fits into the enclosure.

BACKGROUND OF THE INVENTION

As processor capabilities have expanded and power requirements have decreased, there has been an ongoing explosion of devices that operate completely independent of wires or power cords. These "untethered" devices range from cell phones and wireless keyboards to building sensors and active Radio Frequency Identification (RFID) tags.

Engineers and designers of these untethered devices continue to have to deal with the limitations of portable power sources, primarily using batteries as the key design parameter. While the performance of processors and portable devices has been doubling every 18-24 months driven by Moore's law, battery technology in terms of capacity has only been growing at a measly 6% per year. Even with power conscious designs and the latest in battery technology, many devices do not meet the lifetime cost and maintenance requirements for applications that require a large number of untethered devices such as logistics and building automation. Today's devices that need two-way communication require scheduled maintenance every three to 18 months to replace or recharge the device's power source (typically, a battery). One-way devices that simply broadcast their status without receiving any signals, such as automated utility meter readers, have a better battery life typically requiring replacement within 10 years. For both device types, scheduled power-source maintenance is costly and can be disruptive to the entire system that a device is intended to monitor and/or control. Unscheduled maintenance trips are even more costly and disruptive. On a macro level, the relatively high cost associated with the internal battery also reduces the practical, or economically viable, number of devices that can be deployed.

The ideal solution to the power problem for untethered devices is a device or system that can collect and harness sufficient energy from the environment. This energy can be harnessed from many different sources, such as sunlight, vibration, heat, or electro-magnetic radiation. The harnessed energy would then either directly power an untethered device or augment a power supply. However, this ideal solution may not always be practical to implement due to low energy in the environment. Therefore, site restrictions may require the use of a dedicated energy supply. The proposed invention takes these factors into account and provides a solution for both the ideal situation and also for more restrictive circumstances.

BRIEF SUMMARY OF THE INVENTION

The present invention pertains to an apparatus for wirelessly powering a device having an enclosure for a charge storage component. The apparatus comprises a wireless power supply which fits into the enclosure. The apparatus comprises an antenna connected to the wireless power supply.

The present invention pertains to a battery. The battery comprises an energy portion. The battery comprises a first connection through which energy from the energy portion is distributed. The battery comprises a second connection for connecting with an RF harvesting antenna.

The present invention pertains to a cell phone cover for a cell phone. The cell phone comprises a wireless power supply for powering the cell phone. The cell phone comprises an antenna connected to the wireless power supply.

The present invention pertains to a headphone. The headphone comprises a cord. The headphone comprises speakers connected to the cord. The headphone comprises a jack connected to the cord. The headphone comprises a wireless power supply attached to the cord. The headphone comprises an antenna connected to the wireless power supply.

The present invention pertains to a wireless power adapter for a DC jack. The adapter comprises a wireless power supply. The adapter comprises an antenna connected to the wireless power supply. The adapter comprises a connector connected to the wireless power supply that engages the DC jack.

The present invention pertains to an apparatus for wirelessly powering a device. The apparatus comprises a substrate having discrete components and integrated circuits disposed in the device. The apparatus comprises a wireless power supply connected to the substrate.

The present invention pertains to an apparatus for wirelessly powering a device. The apparatus comprises a wireless power supply which is disposed external to the device and is in electrical communication with the device to provide power to the device. The apparatus comprises an antenna connected with the wireless power supply.

The present invention pertains to a method for wirelessly powering a device having an enclosure for a charge storage component. The method comprises the steps of fitting into the enclosure a wireless power supply. There is the step of receiving energy wirelessly through an antenna connected to the wireless power supply.

The present invention pertains to a method for wirelessly powering a device. The method comprises the steps of electrically connecting a wireless power supply to the device. There is the step of receiving energy wirelessly through an antenna connected to the wireless power supply. There is the step of powering the device with the received energy.

The present invention pertains to a method for providing energy to a cell phone. The method comprises the steps of powering the cell phone with a wireless power supply. There is the step of receiving energy wirelessly through an antenna connected to the wireless power supply.

The present invention pertains to an apparatus for wirelessly powering a device having an enclosure for a charge storage component. The apparatus comprises means for supplying power wirelessly which fits into the enclosure. The apparatus includes an antenna connected to the supplying means.

The present invention pertains to a wireless power supply having a connection for electrically connecting the wireless power supply to a device to be powered. The wireless power supply is configured to receive energy wirelessly. The wireless power supply looks like and has a configuration of at least one battery.

The present invention pertains to an apparatus for wirelessly powering a device having an enclosure for a charge-storage component from energy received from a remote wireless power transmitter. The apparatus comprises a wireless power supply which fits into the enclosure. The apparatus comprises an antenna connected to the wireless power supply and remote from the power transmitter.

The present invention pertains to a method for wirelessly powering a device having an enclosure for a charge-storage component. The method comprises the steps of transmitting energy from a wireless power transmitter. There is the step of receiving the energy at a wireless power supply which fits into the enclosure through an antenna connected to the wireless power supply of the device when the device is remote from the power transmitter when the wireless power supply is receiving power from the power transmitter.

BRIEF DESCRIPTION OF THE SEVERAL VIEWS OF THE DRAWING

In the accompanying drawings, the preferred embodiment of the invention and preferred methods of practicing the invention are illustrated in which:

FIG. 11 shows a WPS in a battery with an RF harvesting antenna formed on the outside of the battery case with a dielectric in between.

DETAILED DESCRIPTION OF THE INVENTION

Figure 2A:
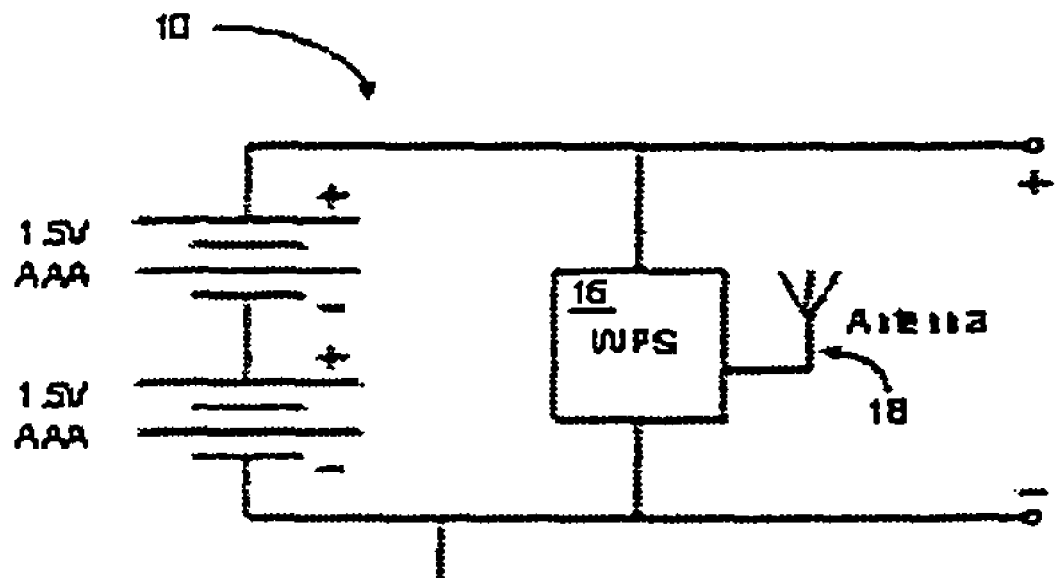
FIG. 2a shows a schematic of the battery pack with a WPS.
Figure 26:
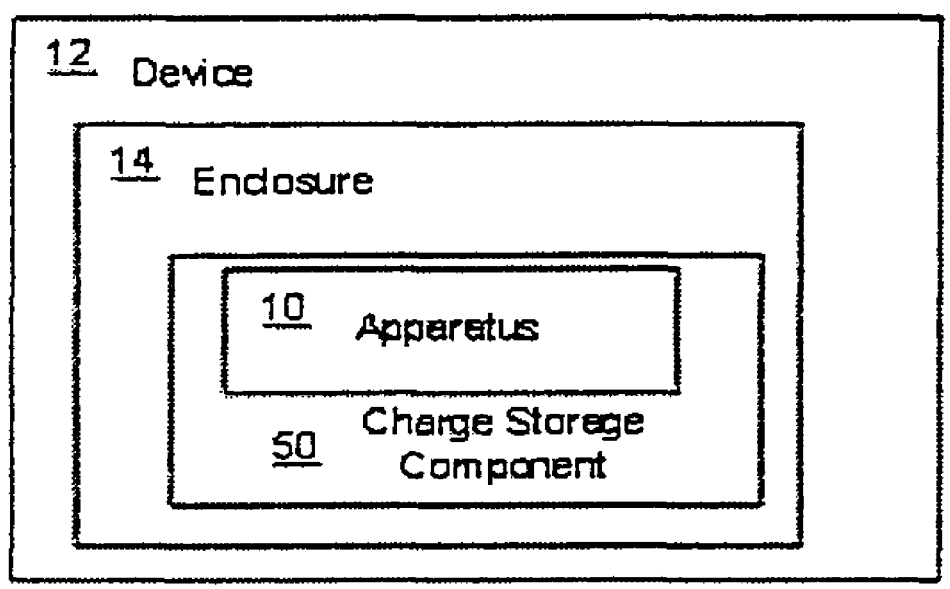
FIG. 26 is block diagram of the present invention.

Referring now to the drawings wherein like reference numerals refer to similar or identical parts throughout the several views, and more specifically to FIG. 26 thereof, there is shown an apparatus 10 for wirelessly powering a device 12 having an enclosure 14 for a charge storage component 50. The apparatus 10, as shown in FIG. 2, comprises a wireless power supply 16 which fits into the enclosure 14. The apparatus 10 comprises an antenna 18 connected to the wireless power supply 16.

Figure 14:
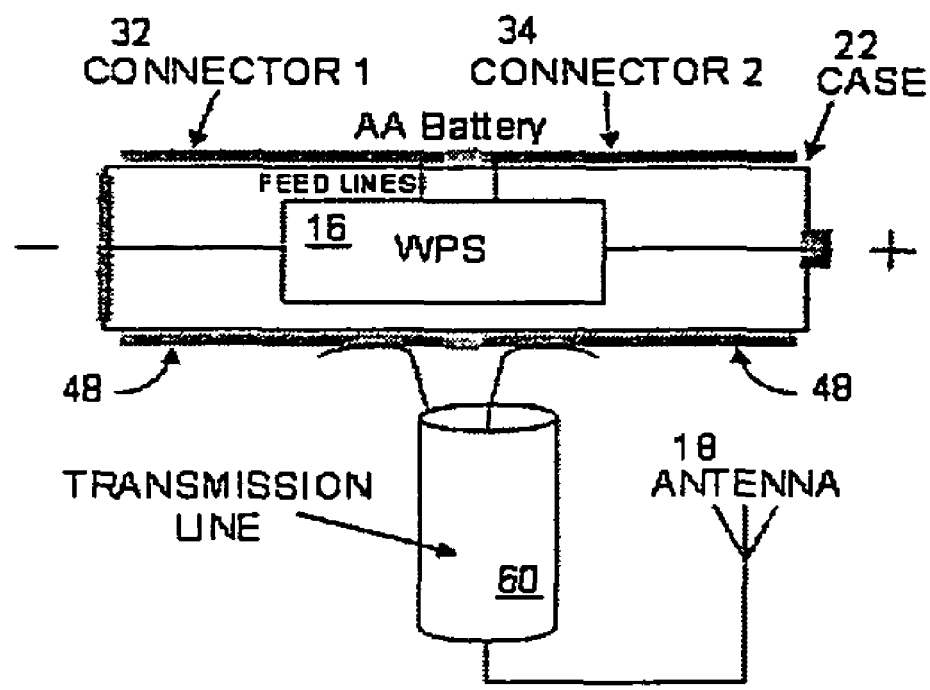
FIG. 14 shows a WPS in a battery with an external RF harvesting antenna connected to specialized terminals.

The present invention pertains to a battery 20, as shown in FIG. 14. The battery 20 comprises an energy portion 28. The battery 20 comprises a first connection 32 through which energy from the energy portion 28 is distributed. The battery 20 comprises a second connection 34 for connecting with an RF harvesting antenna 18.

Figure 20:
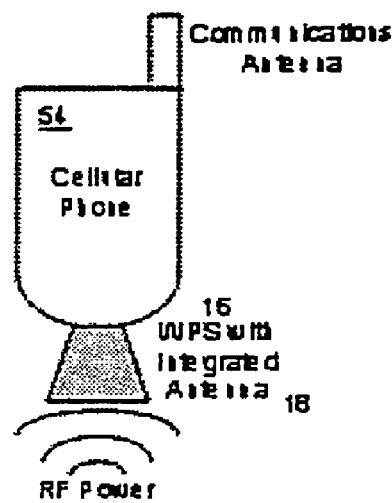
FIG. 20 shows a cellular phone being recharged by an external WPS and RF harvesting antenna connected through the cellular phone battery recharging receptacle.

The present invention pertains to a cell phone cover 54 for a cell phone, as shown in FIG. 20. The cell phone comprises a wireless power supply 16 for powering the cell phone. The cell phone comprises an antenna 18 connected to the wireless power supply 16.

Figure 21:
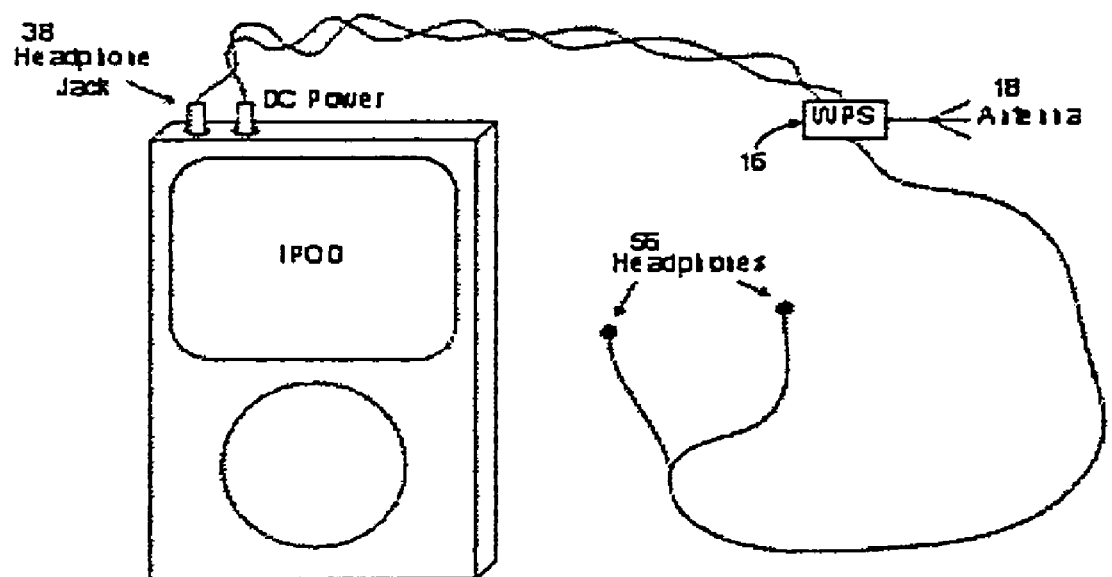
FIG. 21 shows a WPS and RF harvesting antenna attached to the headphone cord of an IPOD supplying recharging power to the IPOD.

The present invention pertains to a headphone 56, as shown in FIG. 21. The headphone 56 comprises a cord. The headphone 56 comprises speakers connected to the cord. The headphone 56 comprises a jack connected to the cord. The headphone 56 comprises a wireless power supply 16 attached to the cord. The headphone 56 comprises an antenna 18 connected to the wireless power supply 16.

Figure 22A:
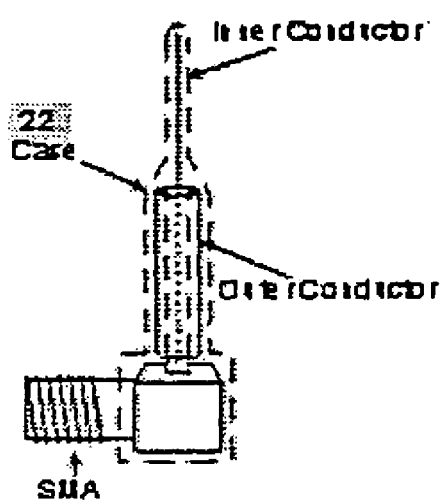
FIG. 22a shows the typical construction of a sleeve dipole.
Figure 22B:
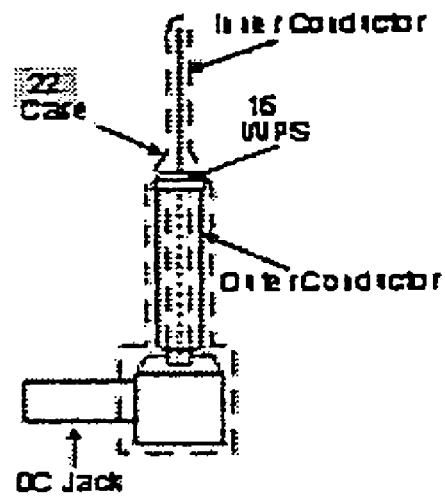
FIG. 22b shows a sleeve dipole with an integrated WPS.

The present invention pertains to a wireless power adapter 38 for a DC jack, as shown in FIG. 22b. The adapter 38 comprises a wireless power supply 16. The adapter 38 comprises an antenna 18 connected to the wireless power supply 16. The adapter 38 comprises a connector 36 connected to the wireless power supply 16 that engages the DC jack.

Figure 24:
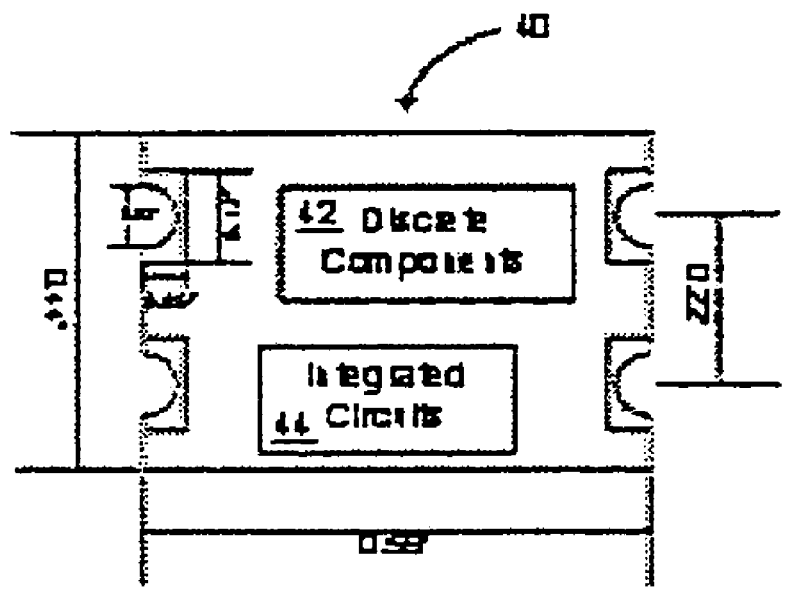
FIG. 24 shows a WPS implemented as a module formed on a PCB.

The present invention pertains to an apparatus 10 for wirelessly powering a device 12, as shown in FIG. 24. The apparatus 10 comprises a substrate 40 having discrete components 42 and integrated circuits 44 disposed in the device 12. The apparatus 10 comprises a wireless power supply 16 connected to the substrate 40.

Figure 4:
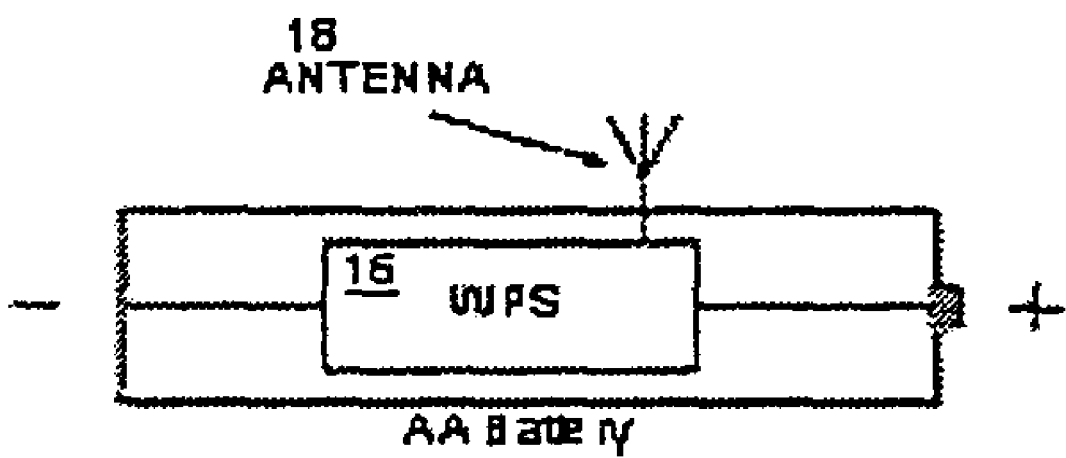
FIG. 4 shows a WPS manufactured to resemble a AA battery with an external antenna.

The present invention pertains to an apparatus 10 for wirelessly powering a device 12, as shown in FIG. 4. The apparatus 10 comprises a wireless power supply 16 which is disposed external to the device 12 and is in electrical communication with the device 12 to provide power to the device 12. The apparatus 10 comprises an antenna 18 connected with the wireless power supply 16.

The present invention pertains to a method for wirelessly powering a device 12 having an enclosure 14 for a charge storage component 50. The method comprises the steps of fitting into the enclosure 14 a wireless power supply 16. There is the step of receiving energy wirelessly through an antenna 18 connected to the wireless power supply 16.

The present invention pertains to a method for wirelessly powering a device 12. The method comprises the steps of electrically connecting a wireless power supply 16 to the device 12. There is the step of receiving energy wirelessly through an antenna 18 connected to the wireless power supply 16. There is the step of powering the device 12 with the received energy.

The present invention pertains to a method for providing energy to a cell phone. The method comprises the steps of powering the cell phone with a wireless power supply 16. There is the step of receiving energy wirelessly through an antenna 18 connected to the wireless power supply 16.

The present invention pertains to an apparatus 10 for wirelessly powering a device 12 having an enclosure 14 for a charge storage component 50. The apparatus 10 comprises means for supplying power wirelessly which fits into the enclosure 14. The apparatus 10 includes an antenna 18 connected to the supplying means.

Figure 3:
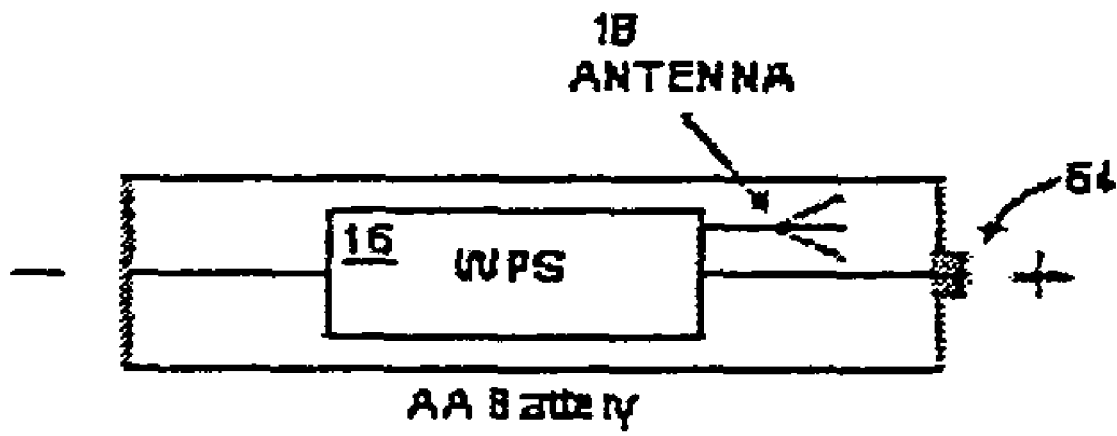
FIG. 3 shows a WPS manufactured to resemble a AA battery with an internal antenna.

The present invention pertains to a wireless power supply 16 having a connection 64 for electrically connecting the wireless power supply 16 to a device 12 to be powered, as shown in FIG. 3. The wireless power supply 16 is configured to receive energy wirelessly. The wireless power supply 16 looks like and has a configuration of at least one battery 20.

The present invention pertains to an apparatus 10 for wirelessly powering a device 12 having an enclosure 14 for a charge-storage component from energy received from a remote wireless power transmitter, as shown in FIG. 2. The apparatus 10 comprises a wireless power supply 16 which fits into the enclosure 14. The apparatus 10 comprises an antenna 18 connected to the wireless power supply 16 and remote from the power transmitter.

Preferably, the device 12 is at least a space of one inch from the power transmitter when the wireless power supply 16 is receiving power from the power transmitter; although the device 12 can be at least three inches, or at least seven inches, or at least twelve inches or even at least twenty inches from the power transmitter when the wireless power supply 16 is receiving power from the power transmitter.

The present invention pertains to a method for wirelessly powering a device 12 having an enclosure 14 for a charge-storage component. The method comprises the steps of transmitting energy from a wireless power transmitter. There is the step of receiving the energy at a wireless power supply 16 which fits into the enclosure 14 through an antenna 18 connected to the wireless power supply 16 of the device 12 when the device 12 is remote from the power transmitter when the wireless power supply 16 is receiving power from the power transmitter. Preferably, the receiving step includes the step of receiving the energy at the wireless power supply 16 when the device 12 is at least a space of one inch from the power transmitter when the wireless power supply 16 is receiving power from the power transmitter; although the device 12 can be at least three inches, or at least seven inches, or at least twelve inches or even at least twenty inches from the power transmitter when the wireless power supply 16 is receiving power from the power transmitter.

In the operation of the invention, the design of a wireless power supply 16 has been described in detail in U.S. Pat. No. 7,027,311, "Method and Apparatus for a Wireless Power Supply," U.S. provisional application Ser. No. 11/447,412, "Powering Devices using RF Energy Harvesting," and U.S. provisional application 60/729,792, "Method and Apparatus for High Efficiency Rectification for Various Loads," all incorporated by reference herein. The referenced patents give great detail on how a wireless power supply or RF energy harvester can be designed and constructed for various applications, such as supplying operational power to a multitude of devices that are either wireless, such as, but not limited to, cellular phones, or have wires for communication or power or both, such as, but not limited to, industrial sensors. It, however, also becomes advantageous, and the focus of the invention, to describe how the wireless power supply (WPS) or RF energy harvester is integrated or implemented with both new and existing devices. It should be noted that the term wireless power supply or WPS may be used to describe the circuitry for RF energy harvesting or the circuitry for RF energy harvesting used in conjunction with an RF harvesting antenna 18. The WPS may be used to harvest RF energy and convert the RF energy into a usable form such as, but not limited to, Direct Current (DC) power.

The present invention may be used with a pulsing RF or other energy transmitter, for example, as described in U.S. provisional application 60/656,165 and Ser. No. 11/356,892, both entitled "Pulsing Transmission Method", incorporated herein by reference.

Figure 1A:
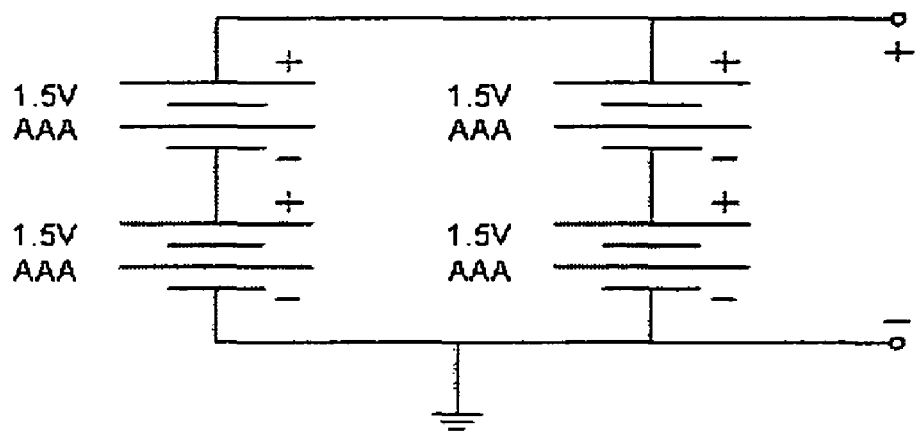
FIG. 1a shows battery pack schematics for the wireless sensor.
Figure 1B:
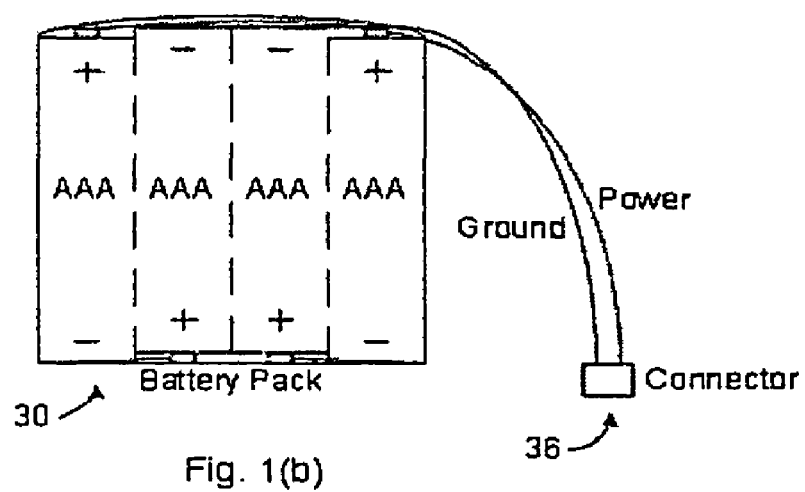
FIG. 1b shows an illustration of the wireless sensor battery pack.
Figure 2B:
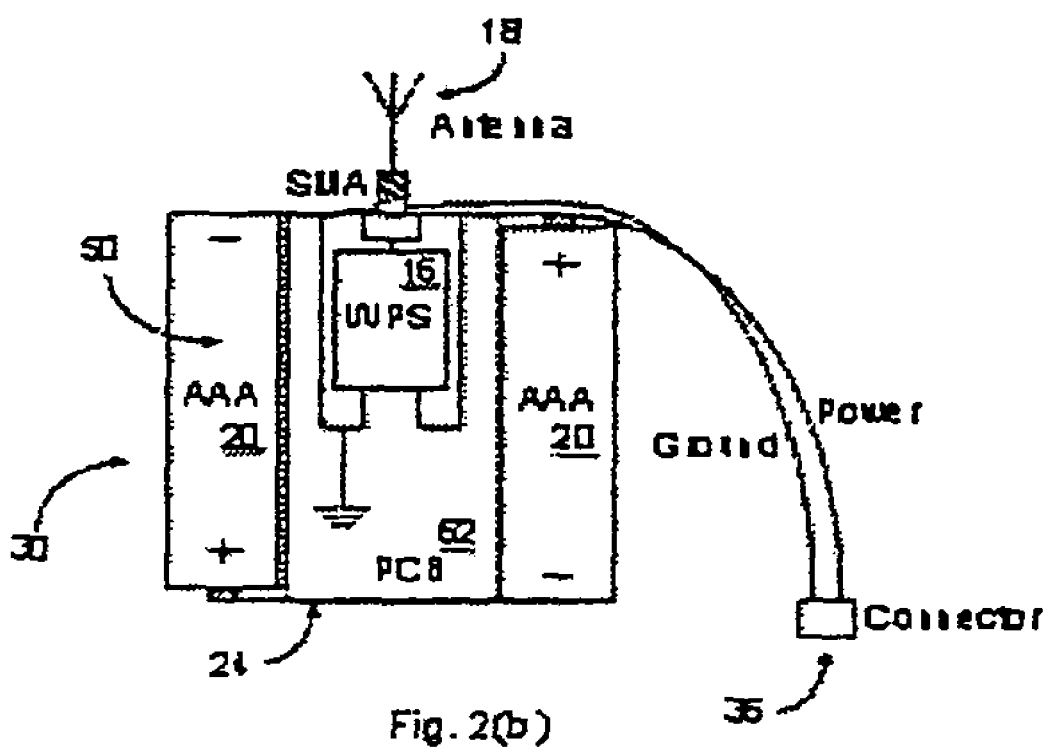
FIG. 2b shows an illustration of a WPS replacing two batteries in a battery pack.

For devices containing a charge storage component 50, such as, but not limited to, a battery 20, it is possible to implement or integrate a wireless power supply 16 in numerous ways. The WPS may be designed to fit into the enclosure 14, compartment, or space used to hold the battery 20, batteries, or charge storage component(s) 50. This may include any battery 20 or charge storage component 50 size and/or shape including, but not limited to, the batteries described in ANSI C18.1M, Part 1-2001, incorporated by reference herein. The WPS may completely replace the battery 20, battery pack 30, or charge storage component 50 in direct powering applications or may replace one or more batteries 20 or charge storage components 50 in battery 20 and charge storage component 50 recharging. As an example, a wireless temperature and humidity sensor was retrofitted with a WPS in order to obtain a longer battery 20 life due to battery 20 recharging by the WPS and antenna 18 capturing and converting RF energy. The wireless sensor contained a 3-volt battery 20 pack 30 that was constructed using four AAA alkaline batteries, whose schematic and drawing is shown in FIG. 1a and FIG. 1b, respectively. The WPS was retrofitted into the wireless sensor by replacing two of the batteries with a WPS or energy harvester. The WPS printed circuit board 62 (PCB) had dimensions of 0.83 by 1.84 inches and was designed to fit into the space left by the two removed batteries. The RF harvesting antenna 18 was connected to the WPS PCB using an end-launch SMA connector 36 that exited the wireless sensor enclosure 14 allowing the RF harvesting antenna 18 to be external to the wireless sensor. A schematic of the WPS used with two AAA batteries can be seen in FIG. 2a. FIG. 2b illustrates how the WPS was configured in order to replace two of the AAA batteries and keep the same size and/or dimensions as the original battery 20 pack 30 of the wireless sensor when used with two AAA batteries. It should be noted that the WPS may be placed in series or parallel to a battery 20 or batteries if found to be advantageous for the application.

In a similar embodiment to that previously described (replacing one or all of the batteries), the WPS may be manufactured in such a way that it resembles or takes the size and shape of any battery type or combination of batteries, such as, but not limited to, those described in ANSI C18.1M, Part 1-2001 or custom sized batteries. As an example, the WPS may be designed with a size and shape allowing it to fit into the case or shell of a standard AA battery 20, as shown in FIG. 3. In this case, there would be no need for battery 20 chemicals and the WPS in the shape of a battery 20 may contain a WPS circuit, PCB, charge storage component 50, and/or an RF harvesting antenna 18. The antenna 18 may also be external to the WPS if found to be advantageous. A charge storage component 50 includes, but is not limited to, a capacitor, super-capacitor, or any other component capable of storing charge.

As previously described, the WPS may replace one or all of the batteries in the device 12, whether in the form of a battery 20 or not. If all batteries are replaced, the WPS provides direct power to the device 12, while, if only one or some batteries in the device 12 are replaced, the WPS may provide current for recharging or augmenting the remaining batteries, therefore eliminating the need for the batteries to be removed for replacement or for recharging, or have the device 12 plugged into a power grid to recharge the batteries. It should be noted that this embodiment will work with rechargeable and non-rechargeable batteries. For non-rechargeable batteries, a protection circuit must be added to insure that no charging current is supplied to the non-rechargeable batteries meaning any energy supplied by the WPS is used to directly power the device 12. As an example, consider a wireless sensor powered by two non-rechargeable AA batteries. Two WPSs manufactured to resemble AA batteries may replace both non-rechargeable batteries. However, if only one WPS manufactured to resemble a AA battery is desired, the other non-rechargeable would have to be replaced with a rechargeable AA or be protected or configured (in series) to ensure that the non-rechargeable battery was not charged by the WPS. The rechargeable battery chemistries used with the invention may be, but are not limited to, Nickel-Metal Hydrid (NiMH), Nickel Cadmium (NiCd), Lithium Ion, Lithium Polymer, Rechargeable Alkaline, Lead Acid, Lithium Thin Film, or any other type of rechargeable battery chemistry 25.

The RF power receiving antenna 18 may be located internally, as shown in FIG. 3, or externally, as shown in FIG. 4, to the battery 20 or battery 20 sized component.

Another embodiment of the WPS that is very similar to what was described previously and shown in FIG. 3 is to include the WPS in the packaging of a standard sized or custom sized rechargeable battery 20 while keeping the battery 20 functionality. This rechargeable battery chemistry 25, or the energy portion 28 of the battery 20, may be, but is not limited to, NiMH, NiCd, Lithium Ion, Lithium Polymer, Rechargeable Alkaline, Lead Acid, Lithium Thin Film or any other type of rechargeable battery chemistry 25. This would require displacing some of the chemicals in the battery 20 to make space for the WPS, PCB and/or possibly the RF harvesting antenna 18. This embodiment can be seen in FIG. 5. The battery 20 would function normally, but would have a slightly smaller capacity of charge because of the removal of some chemicals. The WPS may, in this case, recharge or augment the battery 20 chemicals that are present in the case with the WPS, while the battery 20 chemicals in the case may supply operational power for the device 12 being retrofitted with the WPS. This is a more attractive embodiment than that shown in FIG. 3 for devices that have a chance of not being in an RF power field, such as, but not limited to, cellular phones, PDAs or any other mobile battery 20 powered device. In the previous case, a WPS that resembles a battery 20 but does not have battery 20 functionality, the device 12 using only the WPS for power would not function if the WPS was not receiving power from an RF power transmitter or RF power network. But, for the case shown in FIG. 5, and in the previous case where only one or some batteries of the device 12 are replaced, the WPS-battery 20 combination still has the ability to provide operational power to the device 12 while not in an RF power field. As an example, it is desired to retrofit a cellular phone with a WPS that replaces the battery 20. Most cellular phones have only one battery 20 pack 30 that can be modified. For this example, the embodiment shown in FIG. 3 may not be the best choice because the cellular phone would only work when in an RF power field or while there is charge stored within a charge storage component 50, such as a capacitor, from a time period in an RF power field. Because cellular phones are made to go anywhere, even where there may not be an RF power field, the best choice for retrofitting this cellular phone is to include the rechargeable battery chemistry 25 in with the WPS to provide operational power to the cellular phone when not in an RF power field.

Figure 5:
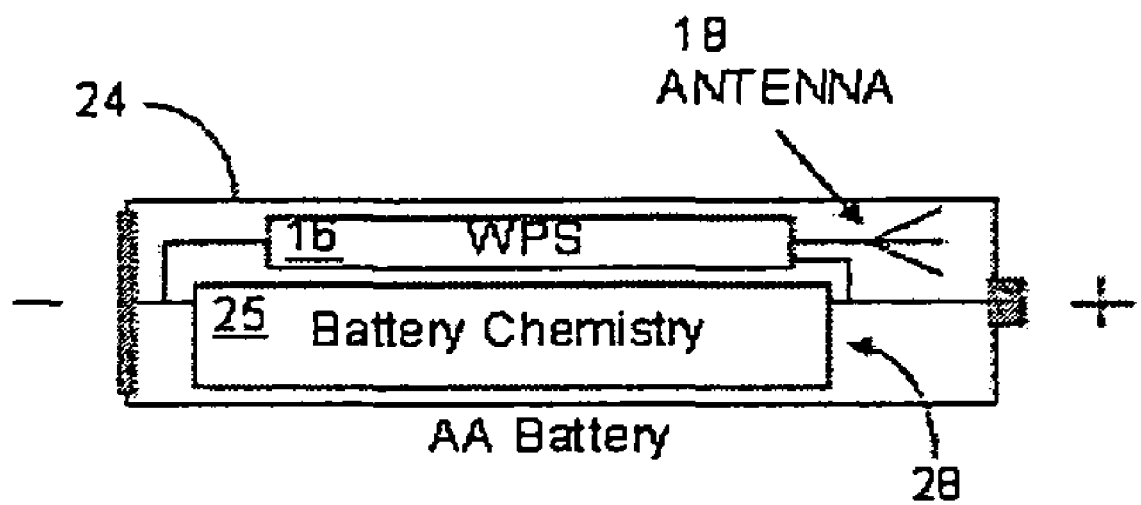
FIG. 5 shows a WPS manufactured to resemble a AA battery, containing battery chemicals and an internal antenna.
Figure 6:
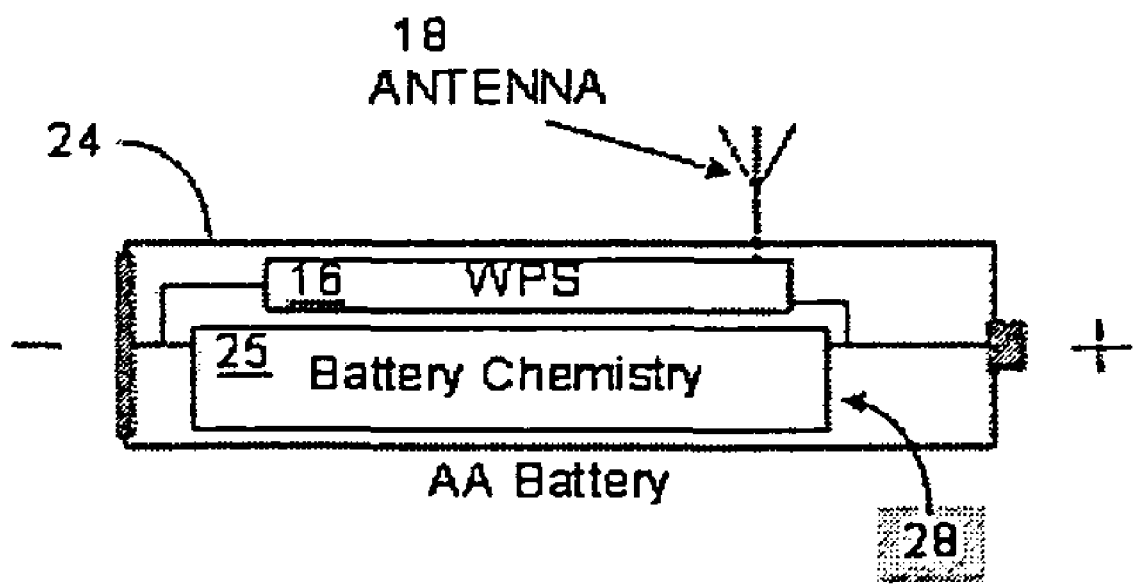
FIG. 6 shows a WPS manufactured to resemble a AA battery, containing battery chemicals and an external antenna.

As was the case with the previous embodiment, the RF power receiving antenna 18 may be located internally, as shown in FIG. 5, or externally, as shown in FIG. 6, to the battery 20 or battery 20 sized component containing battery 20 chemicals.

Figure 7:
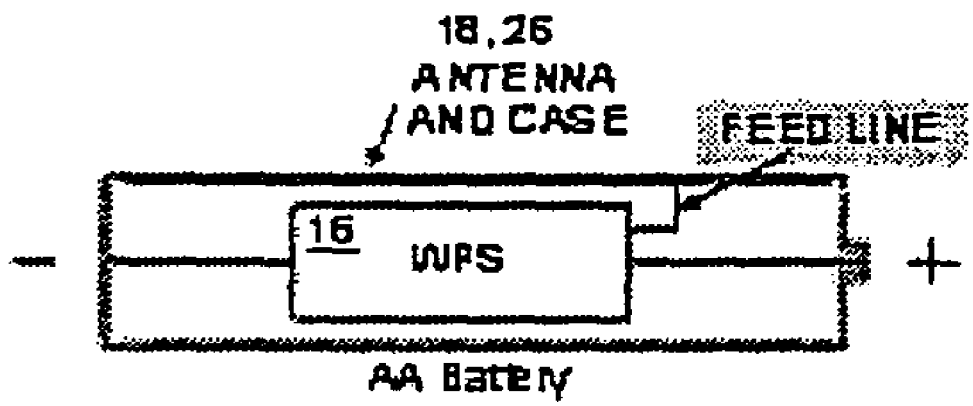
FIG. 7 shows a WPS in a battery using the case as an RF harvesting antenna.
Figure 8:
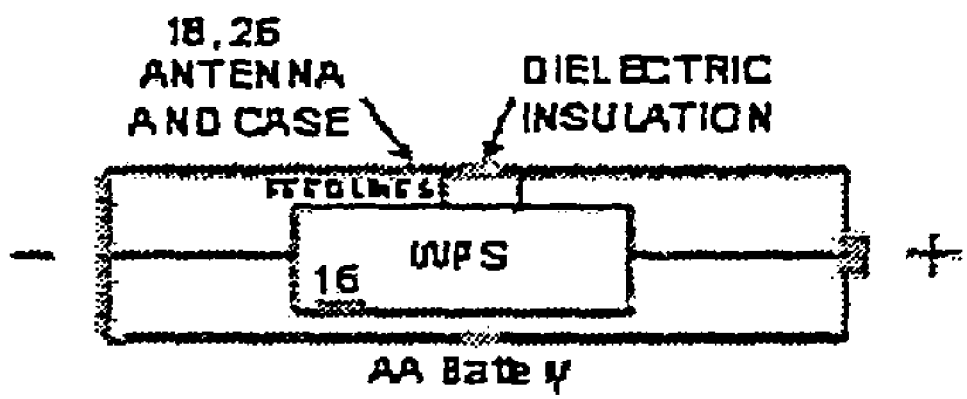
FIG. 8 shows a WPS in a battery using the case as an RF harvesting antenna with an insulating portion in order to form a dipole antenna.

For an internal RF harvesting antenna 18, the antenna 18 may be formed inside the battery casing 26 as long as the case is composed of a material that has very low or no attenuation to the RF field at the frequency or frequencies of interest, such as, but not limited to, plastic. For a non-attenuating case, the antenna 18 may be formed as part of the case. As an example, the case may be made of a plastic material with a metal dipole disposed within the plastic. For a case that is composed of a material that is attenuating, such as metal, it may also be possible to resonate the metallic case of the battery 20 in order to form the RF harvesting antenna 18. Resonating the case can be done whether or not the case of the battery 20 is electrically connected to one of the battery 20 terminals. For the situation where the case is floating, or not electrically connected to a battery 20 terminal, the WPS may be connected to a metallic, or other suitable antenna 18 material, case through an impedance matching network in order to impedance match the metallic case to the WPS. Additionally, the point of contact between the WPS and/or impedance matching circuit and the case may be used to aid in impedance matching and also to help shape and/or improve the radiation characteristics of the battery case 22 RF harvesting antenna 18. An example of this can be seen in FIG. 7, where the antenna 18 is formed as a hollow cylinder and wraps around the WPS and/or battery chemistry 25 as the case. It may be necessary, for any of the embodiments, to divide the battery case 22 into two or more electrically insulated or isolated portions in order to resonate the battery case 22. As an example, the battery case 22 may be formed as a dipole antenna 18 by placing an insulating material or dielectric between the two portions of the dipole (antenna 18 formed as hollow cylinders), as shown in FIG. 8. This example shown in FIG. 8 has two antenna 18 feed lines due to the balanced nature of a dipole antenna 18. The number of feed points will be dependent on the type of antenna 18 used with the WPS.

It should be noted that any of the embodiments herein may be formed as a WPS or as a WPS including battery chemistry 25, whether shown in the illustrative figures or not.

Additionally, a WPS may contain or have external impedance matching to insure maximum power transfer from the antenna 18 to the WPS. A WPS may be designed to match the antenna 18, or vice versa, without the need for impedance matching. The resulting WPS and antenna 18 system, therefore, may or may not have a standard impedance such as 50 ohms.

Figure 9:
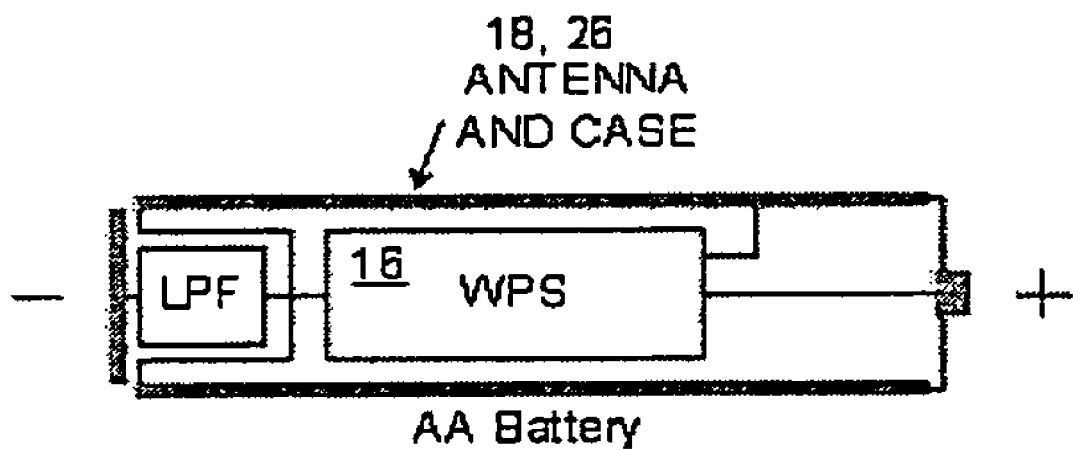
FIG. 9 shows a WPS in a battery using the case as an RF harvesting antenna with RF isolation using a Low Pass Filter.

For the situation where the battery case 22 is electrically connected to one of the battery 20 terminals, isolation may need to be added to the electrically connected battery 20 terminal to insure that RF noise is not injected into the device 12 receiving power from the WPS and/or battery 20 and to insure that the device 12 does not load the battery case 22 RF harvesting antenna 18 and cause the characteristics of the antenna 18, such as impedance, to change. The isolation may be a simple low pass filter (LPF), which would allow the DC energy from the battery 20 to flow to the device 12 while blocking the RF energy. An example of this can be seen in FIG. 9. It should be noted that the LPF may be located internal or external to the battery 20 depending on the application.

Figure 10:
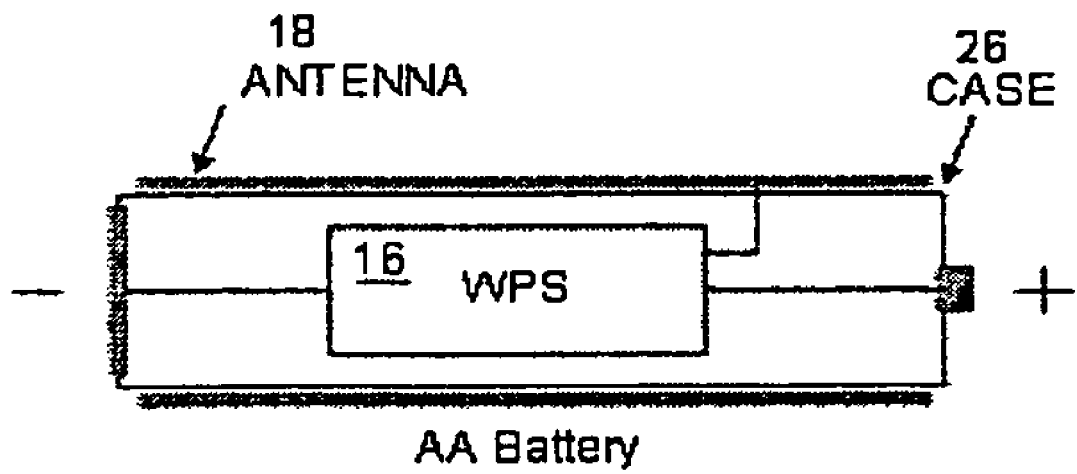
FIG. 10 shows a WPS in a battery with an RF harvesting antenna formed on the outside of the battery case.
Figure 11:
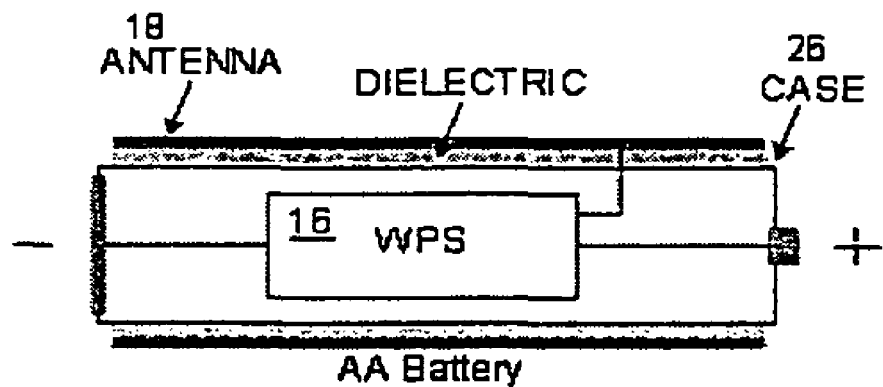
Figure 12:
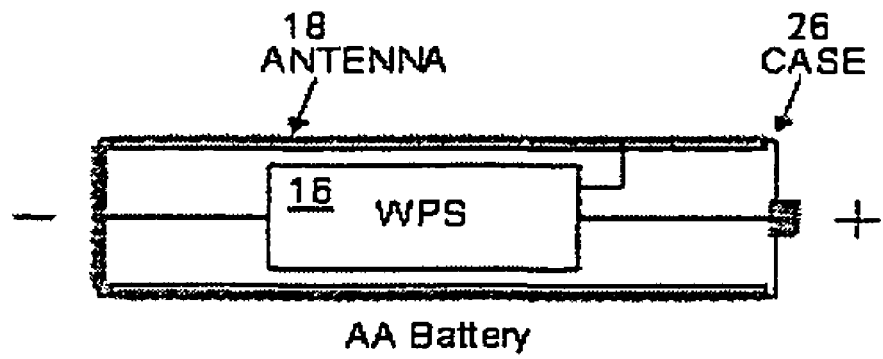
FIG. 12 shows a WPS in a battery with an RF harvesting antenna recessed into the outside of the battery case.
Figure 13:
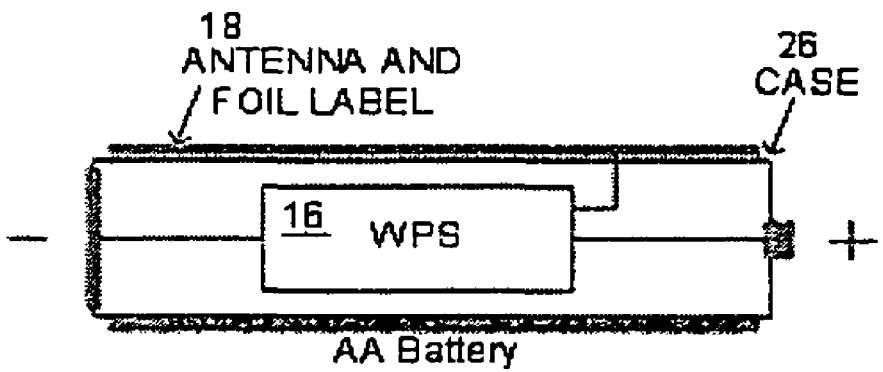
FIG. 13 shows a WPS in a battery with an RF harvesting antenna formed on the outside of the battery case.

For an external RF harvesting antenna 18, the antenna 18 may be formed on the battery 20 or away from the battery 20. The RF harvesting antenna 18 may be formed on the outside of a non-attenuating case as shown in FIG. 10 or may be formed on a metallic or attenuating case by placing a dielectric between the metallic or attenuating case and the antenna 18, as shown in FIG. 11. A metallic case may act as a reflector or ground plane to help increase the gain of the antenna 18. For a metallic case, it is also possible to include a recess in which the antenna 18 can be formed while insuring a flush surface, as seen in FIG. 12. The recess may be confined to one side of the case or may include the entire battery 20 cylinder. Additionally, the metallic case may have an electrically isolated or insulated region where the antenna 18 may be formed. In certain applications, it may be possible to form the antenna 18 using a battery 20 label, which may be partially or completely metallic such as a foil. An example of this can be seen in FIG. 13.

Figure 15:
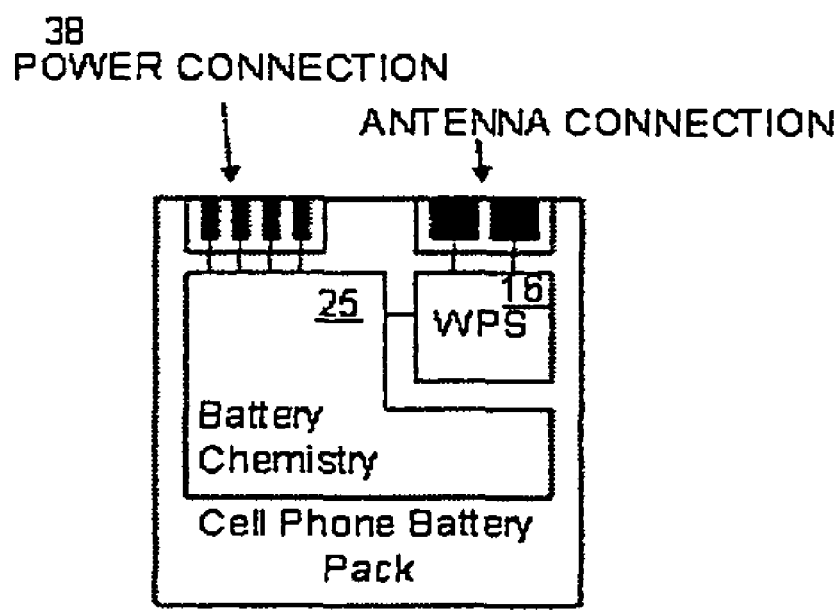
FIG. 15 shows a WPS in a battery with an external RF harvesting antenna connected through a connector.

It may be beneficial in certain applications to have the antenna 18 located away from the battery 20 or charge storage component 50. In these situations, the antenna 18 may connect to specialized terminals located on the battery 20. As an example, the body of the battery 20 may contain two metallic pads 48 or rings around the outside of the battery 20, as shown in FIG. 14, where the antenna 18 or transmission line 60 may connect using spring-loaded contacts. It may also be possible to include a connector 36, jack, plug, or adaptor depending on the size and shape of the battery 20 and battery enclosure 14, as shown in FIG. 15.

Figure 16:
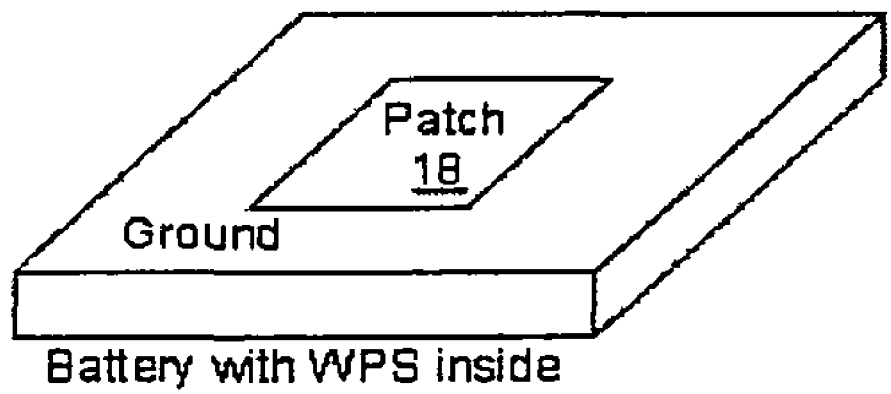
FIG. 16 shows a metallic battery case used as the ground plane for a patch antenna with a coaxial feed and an internal WPS.

It may be advantageous in certain applications to use the case of the battery 20 as part of the antenna 18. As an example, a metallic (or other conducting material) battery case 22 may be used as a ground plane for a patch antenna 18. The patch may be formed above the metallic (or other conducting material) battery case 22 and separated by a non-conductive material. The WPS may be located internally or externally to the battery 20 and may feed the patch antenna 18 with a coax, microstrip, or any other feed technique. An example of a coaxial fed patch antenna 18 using the metallic battery case 22 as the ground plane can be seen in FIG. 16. It should be noted that the battery case 22 may be floating or connected to one of the battery 20 terminals.

It should be noted that the antenna 18 configurations described herein may be implemented with any type and number of antennas. As an example, a WPS may be connected to more than one RF harvesting antenna 18 where each antenna 18 may be, but is not limited to, a dipole, monopole, patch, microstrip, or any other antenna 18 type or configuration. It may also be advantageous in certain applications to have multiple WPS which may be connected to one or more antennas.

Figure 17:
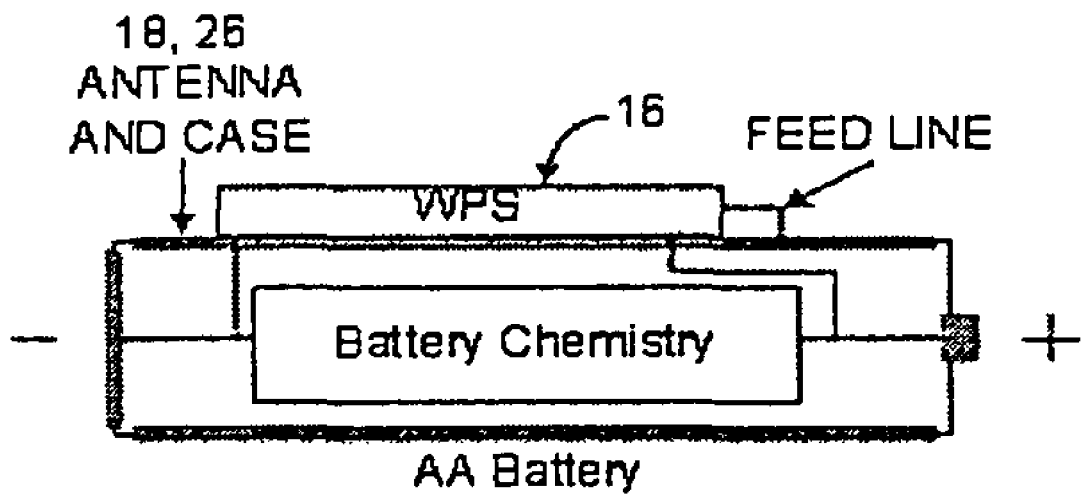
FIG. 17 shows a WPS external to a battery using the battery case as the antenna.

In the previous embodiments, the WPS was integrated into a battery 20 or battery 20 sized enclosure 14 while the antenna was either internal or external. It may be advantageous in certain applications to have the WPS external to the battery 20 or battery 20 sized enclosure 14 while the antenna may be internal or external to the enclosure 14. As an example, the WPS may be formed on the case of the battery 20 while the antenna may be externally connected or formed as part of the battery case 22 as previously described. An example of an external WPS using the battery case 22 as the antenna 18 can be seen in FIG. 17.

Figure 18:
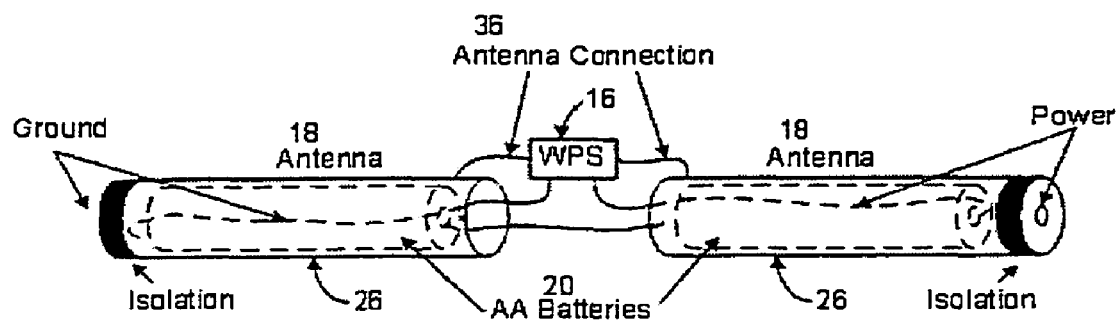
FIG. 18 shows a WPS using two floating AA battery cases as a dipole antenna.

In certain applications, multiple battery cases 22 may be used to form the antenna 18 for a WPS. As an example, two AA batteries with floating cases may be used to form a dipole antenna 18, as shown in FIG. 18. It may be necessary depending on the frequency or frequencies of the RF power to be harvested to include an impedance matching network to match the dipole antenna 18 to the WPS.

Figure 19:
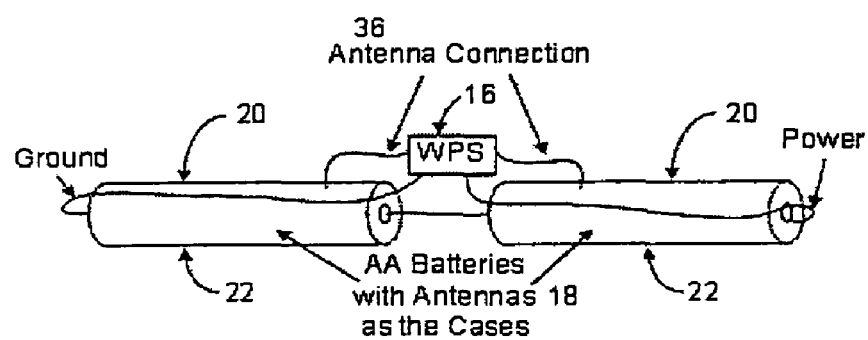
FIG. 19 shows a WPS battery recharging unit with AA batteries located within the antenna structure.

In the previous embodiment, multiple battery cases 22 were used to form the RF harvesting antenna 18. It may not always be advantageous to use the battery cases 22 to form the antenna 18 due to the power connections to the battery 20 which may cause undesirable effects to the radiation characteristics of the antenna 18. Therefore, the RF power harvesting antenna 18 may be formed around the battery 20 or batteries to enable wired connections that do not affect the radiation characteristics of the antenna 18. As an example, two hollow cylinders made of electrically conducting material such as, but not limited to, metal, each containing a AA battery 20, may be used to form a dipole antenna 18. The WPS may be mounted in between the two hollow cylinders with electrical connections to both. Additionally, wires from the WPS may pass inside the cylinder to the ends of the batteries in order to make electrical connection for battery 20 recharging. The wires have no effect on the radiation characteristics of the antenna 18 because they are located inside the cylinders and the RF currents are all present on the surface of the cylinder due to the skin effect. Additionally, isolation may be added at each end of the antenna 18 structure to isolate the power terminals of the WPS battery 20 recharging unit from the RF power harvesting antenna 18 structure. An example of the WPS battery 20 recharging unit can be seen in FIG. 19.

In certain applications, it may not be advantageous to retrofit or redesign a product to contain a WPS and/or RF harvesting antenna 18. Therefore, the WPS and RF harvesting antenna 18 may be designed to be external to the device 12 and the output of the WPS may connect to the device 12 through a connector 36, jack, plug, or adaptor in order for the energy captured by the WPS to be transferred to the device 12 for direct powering applications or to the rechargeable battery 20 or charge storage component 50 in battery 20 recharging or augmenting applications. The WPS may be designed in a manner to connect to an existing port, connector 36, jack, plug or adaptor that was designed for connection of a recharging apparatus 52 obtaining its power from means other than RF power harvesting such as, but not limited to, the AC power grid or DC power in an automobile. As an example, a cellular phone may be recharged with a WPS and RF harvesting antenna 18 using the battery 20 recharging receptacle built into the phone for battery 20 recharging by wired connection to a wall or car outlet. The WPS may be assembled on a PCB with an integrated antenna 18, as shown in FIG. 20. It is also possible to include either the WPS or RF harvesting antenna 18 inside the device 12 while the other is located externally to the device 12 and connected to the device 12 through a connector 36, jack, plug, or adaptor. As an example, the WPS may be small enough to fit into a cellular phone. However, the antenna 18 may be too large or may have better RF power harvesting characteristics when located outside the cellular phone. Therefore, the WPS may be placed inside the cellular phone while the RF power harvesting antenna 18 is located external to the cellular phone. The external RF power harvesting antenna 18 may be connected using an existing or specialized connector 36.

It may be advantageous in certain applications to build the WPS and RF power harvesting antenna 18 into or onto an existing accessory or external component of a device such as, but not limited to, protective covers, protective cases, belt clips, holsters, holders, faceplates, docking stations, necklace holders, armband holders, headphones, carrying cases, or any other device accessory. As an example, cellular phones are frequently protected with a leather case to avoid damage and scratches to the phone. The WPS and RF harvesting antenna 18 may be designed into the cellular phone cover 54 where the cover is made to plug into the battery 20 recharging receptacle built into the phone and connect to the output of the WPS in order to recharge the cellular phone battery 20. The cellular phone cover 54 may also have the ability to accept or pass through a connection from a standard recharging apparatus 52 with a wired connection to a wall or car outlet. As another example, an iPOD or other music device may be recharged in a similar manner as the cellular phone. However, in the case of the iPOD, the WPS and RF harvesting antenna 18 may be located away from the device 12 and attached to the cord of the headphones 56. The output of the WPS may be supplied to the iPOD by a cord, which may attach to the IPOD recharging receptacle through a connector 36, jack, plug, or adaptor as is shown in FIG. 21. It is also possible to integrate the WPS and antenna 18 into the existing headphone 56 cord to eliminate the second wire and connector 36 required.

In certain applications, it may be beneficial to have the WPS integrated into the antenna 18 or antenna 18 structure. Therefore, the output of the antenna 18 would not be RF power, but rather a form of power usable by the device 12, such as, but not limited to, DC power. The integration of the WPS into the antenna 18 eliminates source of loss caused by connectors 36 and lengths of transmission line 60. The resulting WPS and RF harvesting antenna 18 may therefore have a higher efficiency. As an example, a sleeve dipole is an unbalanced antenna 18 designed for direct connection to coaxial cable. The two axial elements of the dipole meet in the center of the dipole and the two conductors exit to the end of the dipole through the lower axial element, which is formed as a hollow cylinder. A typical sleeve dipole can be seen in FIG. 22a. As FIG. 22b shows, a WPS may be integrated into the antenna 18 and the DC power passed to the bottom of the dipole by two conductors connected to a DC connector 36, jack, plug, or adaptor.

Figure 23:
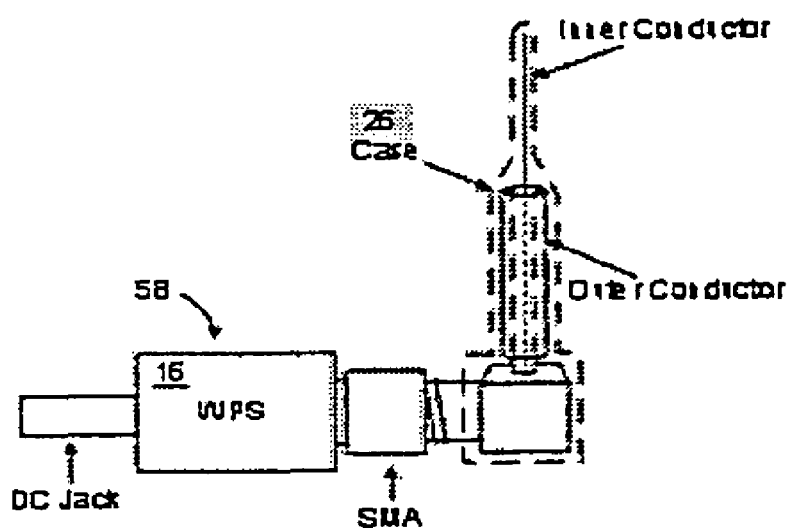
FIG. 23 shows an in-line coaxial WPS connected to a sleeve dipole antenna.

It may also be advantageous in certain applications to have the WPS implemented as a coaxial (or other transmission line 60) in-line apparatus 58. The output of the antenna 18 may connect to the WPS and the WPS passes the DC power to the device 12 connected to the WPS by a connector 36, jack, plug, or adaptor. As an example, a sleeve dipole with an SMA connector 36 may be connected to an opposite gender SMA connector 36 on a WPS. The WPS would accept the RF power provided by the RF harvesting antenna 18 and the WPS would output the DC power to the device 12 connected by a connector 36, jack, plug, or adaptor in order to directly power the device 12 or to recharge the device's 12 charge storage component 50. An example of an in-line coaxial WPS can be seen in FIG. 23.

The WPS can be formed in numerous ways. For new designs, the WPS may be integrated onto an existing or newly designed PCB with an integrated or external antenna 18 for harvesting the RF energy. The WPS may be in the form of discrete components 42 and/or an integrated circuit. In the case of an integrated circuit, it may be necessary to use one or more external components in order to minimize the loss to the conversion efficiency of the WPS caused by parasitic elements inherent to an integrated circuit such as, but not limited to, finite resistance of conductors, semiconductors, and metal-semiconductor junctions, low quality factor inductors, capacitance to the substrate 40, capacitance to other components, and other parasitic elements.

The WPS may also be implemented as a PCB (or other substrate 40) containing discrete components 42 and integrated circuits 44. The PCB may contain thru-hole pins or surface mount pads 48 for connection to another PCB or substrate 40. As an example, the WPS shown in U.S. provisional application 60/729,792, "Method and Apparatus for High Efficiency Rectification for Various Loads," was implemented as a module with four surface mount pads. The RF input pad was connected to the antenna 18, the output pad was connected to the device 12 for direct powering and to the battery 20 or charge storage component 50 for recharging applications, and the other two pads were connected to ground. The module was designed to be soldered onto another PCB to insure a proper layout and ease of use by the user. FIG. 24 shows the dimensions of the WPS module.

Figure 25:
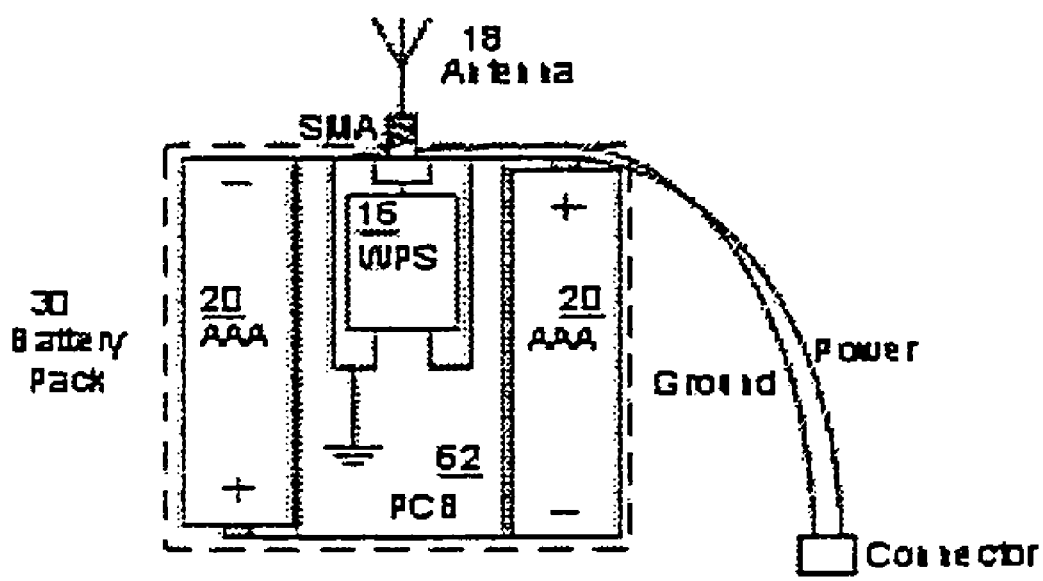
FIG. 25 shows a WPS and RF power harvesting antenna formed inside a battery pack.

The WPS may be implemented as or in a battery 20 pack 30 when found to be advantageous. As an example, the WPS and RF power harvesting antenna 18 may be formed within or on the external packaging of the battery 20 or batteries while remaining outside the battery casing 26. As a specific example, a cellular phone battery is typically incased in a plastic case in order to provide protection, give support, and offer an aesthetically pleasing size and shape. The battery and possibly the battery recharging or protection circuitry are formed within the plastic case. The WPS and RF power harvesting antenna 18 may also be formed within the plastic case making it part of the battery pack 30. In certain applications, it may be beneficial to form the RF power harvesting antenna 18 as an external component or form the RF power harvesting antenna 18 on the outside of the plastic, or other material, case used to incase the battery 20. An example of a WPS incased with a battery 20 or batteries is shown in FIG. 25.

The invention should not be confused with power transfer by inductive coupling, which requires the device 12 to be relatively close to the power transmission source. The *RFID Handbook* by the author Klaus Finkenzeller defines the inductive coupling region as distance between the transmitter and receiver of less than 0.16 times lambda where lambda is the wavelength of the RF wave. The invention can be implemented in the near-field (sometimes referred to as inductive) region as well as the far-field region. The far-field region is distances greater than 0.16 times lambda.

In any embodiment of the present invention, the RF power transmitted may be limited to include power only, that is, data is not present in the signal. If data is required by the application, the data is, preferably, transmitted in a separate band and/or has a separate receiver.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus, comprising:
    a wireless power supply configured to have a complimentary fit with an enclosure of a device, the enclosure configured to receive a charge storage component, the wireless power supply configured to convert electromagnetic energy to a direct current; and
    an antenna connected to the wireless power supply, the antenna being part of a battery configured to fit within the enclosure.

2. The apparatus of claim 1, wherein the antenna is disposed within a battery case of the battery.

3. The apparatus of claim 1, wherein:
    the battery includes a battery case having a first portion and a second portion, the second portion separated from the first portion by a dielectric;
    the antenna including the first portion of the battery case and the second portion of the battery case.

4. The apparatus of claim 1, further comprising an impedance matching network operatively coupled to the wireless power supply and the antenna.

5. The apparatus of claim 1, wherein the charge storage component is a first charge storage component, the apparatus further comprising:
a second charge storage component operatively coupled to the wireless power supply and configured to store at least a portion of the direct current, the second charge storage component being part of the battery.

6. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the antenna being part of a battery case of a battery.

7. The apparatus of claim 6, wherein the antenna is disposed within a battery case of the battery.

8. The apparatus of claim 6, wherein:
the battery case has a first portion and a second portion, the second portion separated from the first portion by a dielectric;
the antenna including the first portion of the battery case and the second portion of the battery case.

9. The apparatus of claim 6, further comprising an impedance matching network operatively coupled to the wireless power supply and the antenna.

10. The apparatus of claim 6, further comprising a low pass filter operatively coupled to the wireless power supply and at least one terminal of the battery.

11. The apparatus of claim 6, wherein the charge storage component is a first charge storage component, the apparatus further comprising:
a second charge storage component operatively coupled to the wireless power supply and configured to store at least a portion of the direct current, the second charge storage component being part of the battery.

12. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the antenna is being part of a battery case of a battery, at least a portion of the battery case forms a ground plane for the antenna.

13. The apparatus of claim 12, further comprising a dielectric disposed between the battery case and the antenna.

14. The apparatus of claim 12, further comprising a low pass filter operatively coupled to the wireless power supply and one terminal of the battery.

15. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the antenna being at least part of more than one battery configured to fit within the enclosure.

16. The apparatus of claim 15, wherein:
the more than one battery includes a first battery and a second battery;
the antenna is a dipole antenna;
the first battery includes a first portion of the dipole antenna; and
the second battery includes a second portion of the dipole antenna.

17. The apparatus of claim 15, further comprising an impedance matching network operatively coupled to the wireless power supply and the antenna.

18. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the antenna being external with respect to at least part of a battery case of a battery.

19. The apparatus of claim 18, wherein the antenna is separated from the battery case by a dielectric, the dielectric coupled to the battery case, the antenna coupled to the dielectric.

20. The apparatus of claim 18, wherein the antenna is disposed within the device, the wireless power supply is removably connected to the antenna when the wireless power supply is disposed within the enclosure.

21. The apparatus of claim 18, wherein the antenna is removably connected to the wireless power supply.

22. The apparatus of claim 18, wherein:
the antenna is disposed within the device; and
the wireless power supply is removably connected to the antenna via a plurality of contacts when the wireless power supply is disposed within the enclosure.

23. The apparatus of claim 18, wherein:
the antenna is disposed within the device; and
the wireless power supply is removably connected to the antenna via a connector when the wireless power supply is disposed within the enclosure.

24. The apparatus of claim 18, wherein the charge storage component is a first charge storage component, the apparatus further comprising:
a second charge storage component operatively coupled to the wireless power supply and configured to store at least a portion of the direct current, the second charge storage component being part of the battery.

25. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the antenna being part of a battery configured to fit within the enclosure,
the wireless power supply being disposed external to the battery.

26. The apparatus of claim 25, wherein the antenna is coupled to a battery case of the battery.

27. The apparatus of claim 25, further comprising an impedance matching network operatively coupled to the wireless power supply and the antenna.

28. The apparatus of claim 25, wherein:
the wireless power supply is disposed within the device; and
the antenna is removably connected to the wireless power supply via a connector when the battery is disposed within the enclosure.

29. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, physical dimensions of the apparatus substantially corresponding to physical dimensions of a battery.

30. The apparatus of claim 29, wherein the antenna is internal with respect to the wireless power supply.

31. The apparatus of claim 29, wherein the antenna is external with respect to the wireless power supply.

32. The apparatus of claim 29, wherein the antenna is integral with a housing of the wireless power supply.

33. The apparatus of claim 29, wherein:
the antenna is disposed within the device; and
the wireless power supply is removably connected to the antenna via a plurality of contacts when the wireless power supply is disposed within the enclosure.

34. The apparatus of claim 29, wherein:
the antenna is disposed within the device; and
the wireless power supply is removably connected to the antenna via a connector when the wireless power supply is disposed within the enclosure.

35. The apparatus of claim 29, wherein the charge storage component is a first charge storage component, the apparatus further comprising:
a second charge storage component operatively coupled to the wireless power supply and configured to store at least a portion of the direct current, the second charge storage component being part of the battery.

36. An apparatus, comprising:
a wireless power supply configured to have a complimentary fit with an enclosure of a device, the enclosure configured to receive a charge storage component, the wireless power supply configured to convert electromagnetic energy to a direct current;
an antenna connected to the wireless power supply; and a battery, the wireless power supply being embedded in the battery.

37. The apparatus of claim 36, wherein:
the battery includes a battery case having a first portion and a second portion, the second portion separated from the first portion by a dielectric; and
the antenna including the first portion of the battery case and the second portion of the battery case.

38. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the wireless power supply is being disposed in the antenna.

39. The apparatus of claim 38, wherein the antenna including a first portion and a second portion, the second portion separated from the first portion by a dielectric.

40. The apparatus of claim 38, further comprising an impedance matching network operatively coupled to the wireless power supply and the antenna.

41. The apparatus of claim 38, wherein:
the antenna is disposed within the device; and
the wireless power supply is removably connected to the antenna via a plurality of contacts when the wireless power supply is disposed within the enclosure.

42. The apparatus of claim 38, wherein:
the antenna is disposed within the device; and
the wireless power supply is removably connected to the antenna via a connector when the wireless power supply is disposed within the enclosure.

43. An apparatus, comprising:
a wireless power supply configured to have a complimentary fit with an enclosure of a device, the enclosure configured to receive a charge storage component, the wireless power supply configured to convert electromagnetic energy to a direct current; and
an antenna connected to the wireless power supply, the wireless power supply containing battery chemicals.

44. The apparatus of claim 43, wherein the antenna is internal with respect to the wireless power supply.

45. The apparatus of claim 44, wherein the antenna is external with respect to the wireless power supply.

46. The apparatus of claim 43, wherein:
the wireless power supply includes a case; and
the antenna is separated from the case by a dielectric.

47. An apparatus, comprising:
a battery including a wireless power supply and a connector, the wireless power supply including an electro-magnetic energy harvesting module, the connector configured such that energy from the battery is distributed via the connector.

48. The apparatus of claim 47, wherein the connector is a first connector, the apparatus further comprising a second connector for connecting the wireless power supply with an electro-magnetic harvesting antenna.

49. The apparatus of claim 47, further comprising an antenna operatively coupled to the wireless power supply.

50. The apparatus of claim 47, further comprising:
a battery case enclosing at least a portion of the battery; and
an antenna operatively coupled to the wireless power supply, the antenna being external to the battery case.

51. The apparatus of claim 47, further comprising:
a battery case enclosing at least a portion of the battery; and
an antenna operatively coupled to the wireless power supply, the antenna being internal to the battery case.

52. The apparatus of claim 47, further comprising:
a battery case enclosing at least a portion of the battery; and
an antenna operatively coupled to the wireless power supply, the antenna being integral to the battery case.

53. An apparatus, comprising:
a substrate; and
a wireless power supply including energy harvesting circuitry, the energy harvesting circuitry including discrete components and integrated circuits connected to the substrate, the wireless power supply configured to be electrically coupled to a device such that the wireless power supply provides operational power to the device.

54. The apparatus of claim 53, wherein:
the substrate is a first substrate; and
the wireless power supply is configured to be operatively coupled to a second substrate.

55. The apparatus of claim 53, wherein:
the substrate is a first substrate; and
the wireless power supply is configured to be operatively coupled to a second substrate; and
the second substrate is part of the device.

56. The apparatus of claim 53, further comprising surface mount pads operatively coupled to the substrate.

57. The apparatus of claim 53, further comprising pins operatively coupled to the substrate.

58. The apparatus of claim 53, wherein the wireless power supply is connected in parallel with one or more batteries within the device.

59. The apparatus of claim 53, wherein the wireless power supply is connected in series with one or more batteries within the device.

60. The apparatus of claim 53, wherein the wireless power supply is configured to be operatively coupled to a battery pack.

61. The apparatus of claim 53, wherein the substrate is a printed circuit board.

62. The apparatus of claim 53, wherein the substrate is a printed circuit board, the apparatus further comprising:
surface mount pads operatively coupled to the printed circuit board.

63. The apparatus of claim 53, further comprising a charge storage component operatively coupled to the substrate and the wireless power supply, the charge storage component configured to store at least a portion of the operational power.

64. The apparatus of claim 53, further comprising a capacitor operatively coupled to the substrate and the wireless power supply, the capacitor configured to store at least a portion of the operational power.

65. An apparatus, comprising:
a wireless power supply configured to be disposed external to a device and be in electrical communication with the device to provide direct current power to the device; and
an antenna operatively to the wireless power supply, the wireless power supply configured to receive electro-magnetic energy via the antenna and convert the received electro-magnetic energy to the direct current power, the wireless power supply being configured to be incorporated into the antenna.

66. The apparatus of claim 65, wherein the antenna including a first portion and a second portion, the second portion separated from the first portion by a dielectric.

67. The apparatus of claim 65, wherein the antenna including a first portion and a second portion, the first portion being substantially cylindrical, the second portion being substantially cylindrical, the second portion separated from the first portion by a dielectric.

68. The apparatus of claim 65, wherein the wireless power supply is configured to be removably coupled to the device.

69. The apparatus of claim 65, further comprising a charge storage component operatively coupled to the wireless power supply and configured to store at least a portion of the direct current power.

70. An apparatus, comprising:
a wireless power supply configured to be disposed external to a device and be in electrical communication with the device to provide direct current power to the device; and
an antenna operatively coupled to the wireless power supply, the wireless power supply configured to receive electro-magnetic energy via the antenna and convert the received electro-magnetic energy to the direct current power, the wireless power supply being configured to be incorporated as an in-line apparatus of a transmission line.

71. The apparatus of claim 70, wherein the wireless power supply is configured to be removably coupled to the device.

72. The apparatus of claim 70, wherein the in-line apparatus is a coaxial in-line apparatus.

73. The apparatus of claim 70, wherein the in-line apparatus includes an input connector and an output connector, the input connector configured to be coupled to the antenna, the output connector configured to be coupled to the device to provide the direct current power to the device.

74. An apparatus, comprising:
a wireless power supply configured to be disposed external to a device and be in electrical communication with the device to provide direct current power to the device; and
an antenna operatively coupled to the wireless power supply, the wireless power supply configured to receive electro-magnetic energy via the antenna and convert the received electro-magnetic energy to the direct current power, the wireless power supply being configured to be operatively coupled to a printed circuit board of the device.

75. The apparatus of claim 74, wherein:
the wireless power supply includes a first connector; and
the printed circuit board includes a second connector, the first connector configured to be coupled to the second connector.

76. The apparatus of claim 74 wherein:
the wireless power supply includes a connector; and
the printed circuit board includes a plurality of pins, the connector configured to be coupled to the plurality of pins.

77. The apparatus of claim 74, further comprising a charge storage component operatively coupled to the wireless power supply and configured to store at least a portion of the direct current power.

78. An apparatus, comprising:
a wireless power supply configured to be disposed external to a device and be in electrical communication with the device to provide direct current power to the device, the device having an enclosure, the wireless power supply being supported by the enclosure; and
an antenna operatively coupled to the wireless power supply, the wireless power supply configured to receive electro-magnetic energy via the antenna and convert the received electro-magnetic energy to the direct current power.

79. The apparatus of claim 78, wherein:
the antenna is disposed within the device; and
the wireless power supply is removably connected to the antenna via a plurality of contacts when the wireless power supply is supported by the enclosure.

80. The apparatus of claim 78, wherein:
the antenna is disposed within the device; and
the wireless power supply is removably connected to the antenna via a connector when the wireless power supply is supported by the enclosure.

81. The apparatus of claim 78, wherein physical dimensions of the apparatus substantially correspond to physical dimensions of the enclosure.

82. The apparatus of claim 78, wherein:
the wireless power supply is removably connected to the device when the wireless power supply is supported by the enclosure; and
the antenna is part of the wireless power supply.

83. An apparatus, comprising:
a wireless power supply configured to be disposed external to a device and be in electrical communication with the device to provide direct current power to the device; and
an antenna operatively coupled to the wireless power supply, the wireless power supply configured to receive electro-magnetic energy via the antenna and convert the received electro-magnetic energy to the direct current power, the wireless power supply being disposed within the antenna.

84. The apparatus of claim 83, wherein the antenna includes a first portion and a second portion, the second portion separated from the first portion by a dielectric.

85. The apparatus of claim 83, wherein the antenna includes a first portion and a second portion, the first portion is substantially cylindrical, the second portion is substantially cylindrical, the second portion is separated from the first portion by a dielectric.

86. The apparatus of claim 83, wherein the wireless power supply is configured to be removably coupled to the device.

87. An apparatus, comprising:
an electro-magnetic energy harvesting module configured to convert electro-magnetic energy into direct current power; and
a connection for electrically connecting the apparatus to a device to receive the direct current power as operational power, the physical dimensions of the apparatus are the same as physical dimensions of at least one battery.

88. The apparatus of claim 87, further comprising an antenna operatively coupled to the electro-magnetic energy harvesting module, the antenna configured to receive the electro-magnetic energy.

89. The apparatus of claim 87, wherein the connection is a first connection, the apparatus further comprising:
a second connection configured to be operatively coupled to an antenna at the device, the antenna configured to receive the electro-magnetic energy.

\* \* \* \* \*

UNITED STATES PATENT AND TRADEMARK OFFICE
CERTIFICATE OF CORRECTION

| | | |
|---|---|---|
| PATENT NO. | : 7,812,771 B2 | Page 1 of 1 |
| APPLICATION NO. | : 11/494108 | |
| DATED | : October 12, 2010 | |
| INVENTOR(S) | : Charles E. Greene et al. | |

It is certified that error appears in the above-identified patent and that said Letters Patent is hereby corrected as shown below:

Column 5, line 57, replace "provisional application" with -- patent application --.

Column 13, line 45 replace "antenna is being" with -- antenna being --.

Column 15, line 51 replace "supply is being" with -- supply being --.

Column 17, line 22 after "operatively" insert -- coupled --.

Signed and Sealed this
Eighteenth Day of January, 2011

David J. Kappos
*Director of the United States Patent and Trademark Office*